May 2, 1967 H. V. WILLIS 3,317,179
VALVE OPERATING LINKAGES
Filed July 31, 1964 5 Sheets-Sheet 1

INVENTOR
HAROLD VICTOR WILLIS
By: Norris & Bateman, Attys

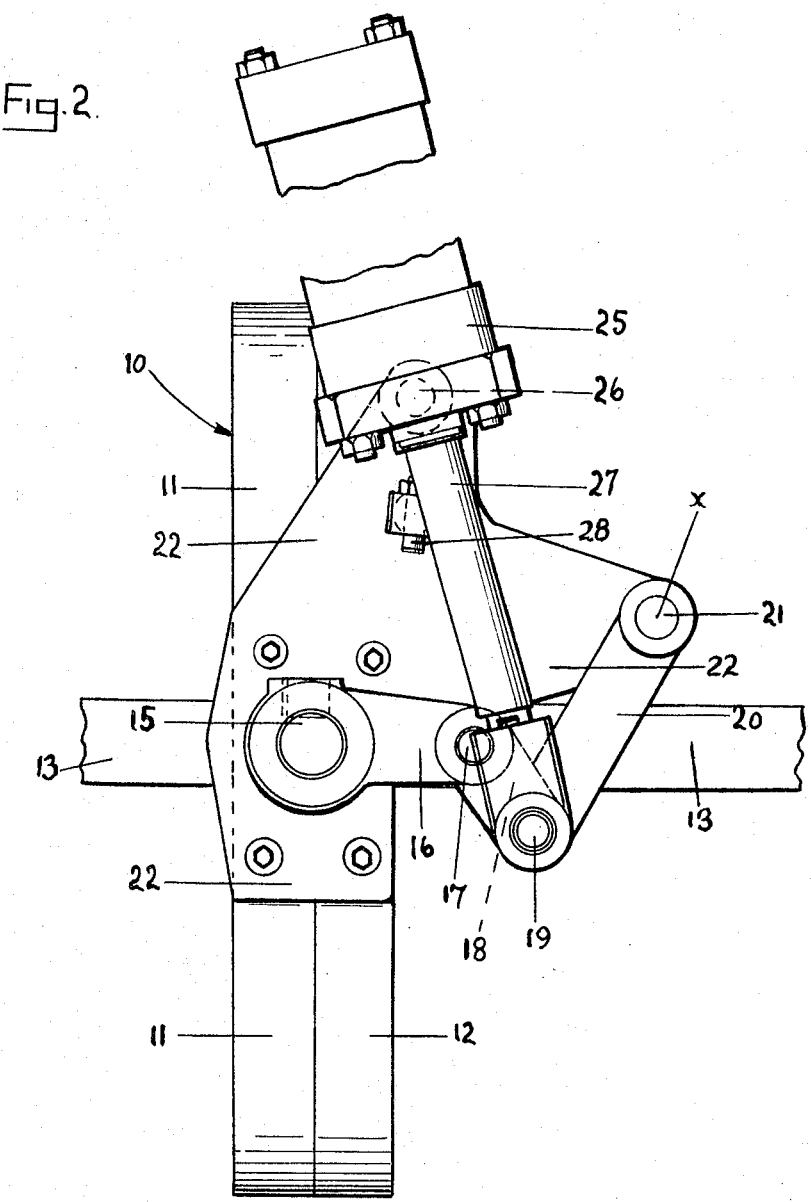

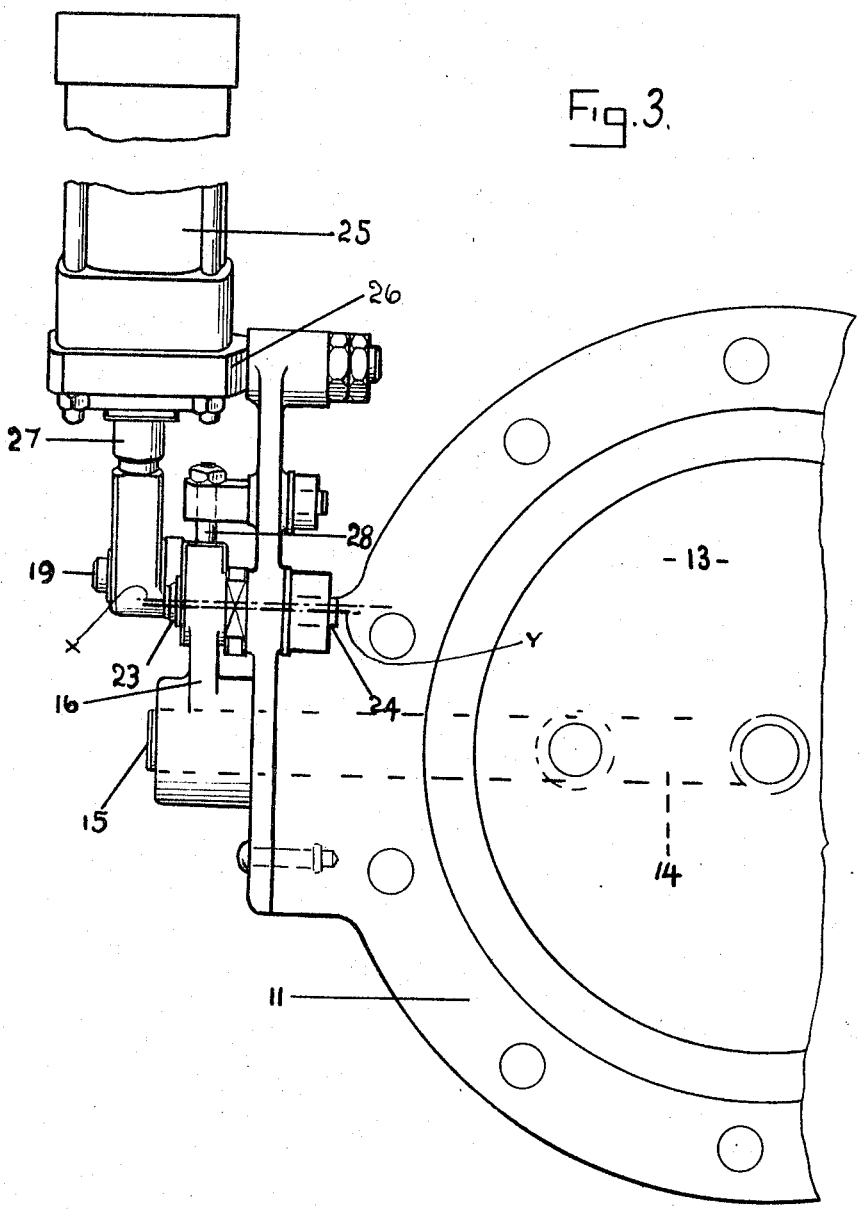

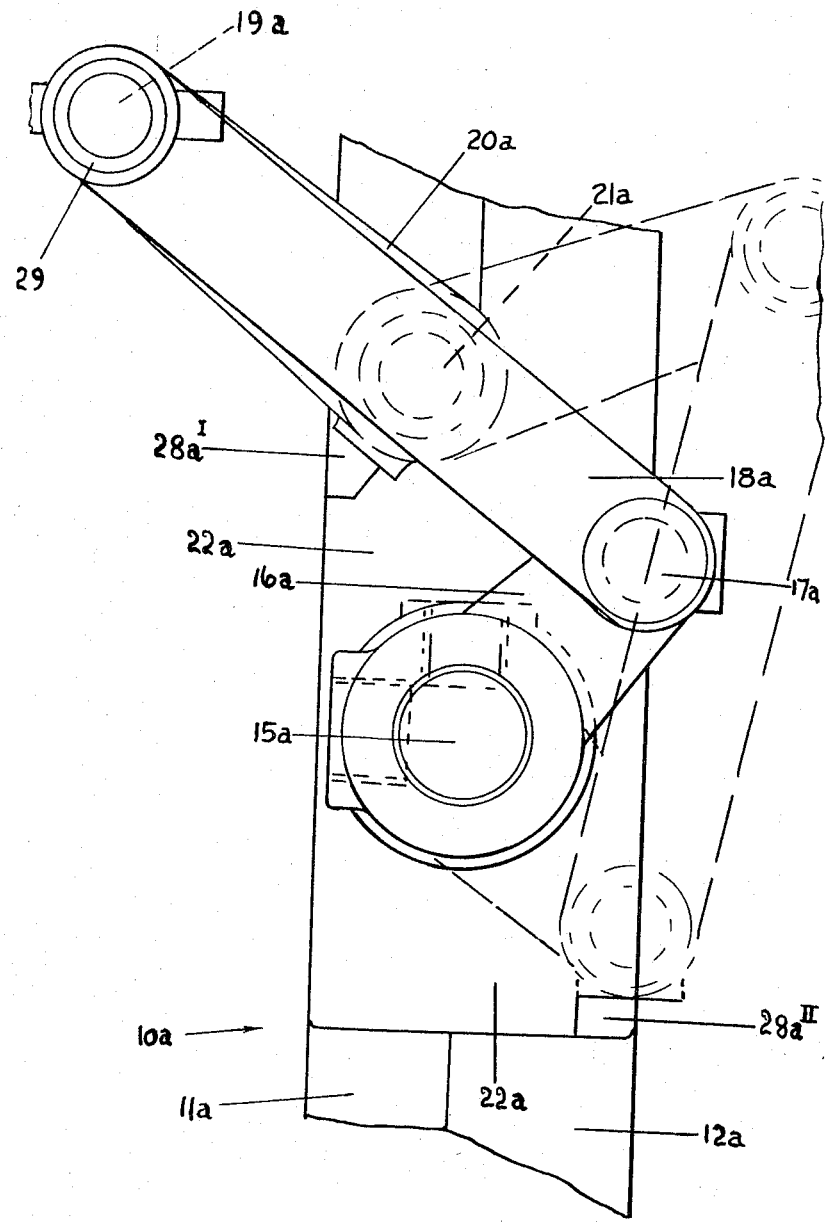

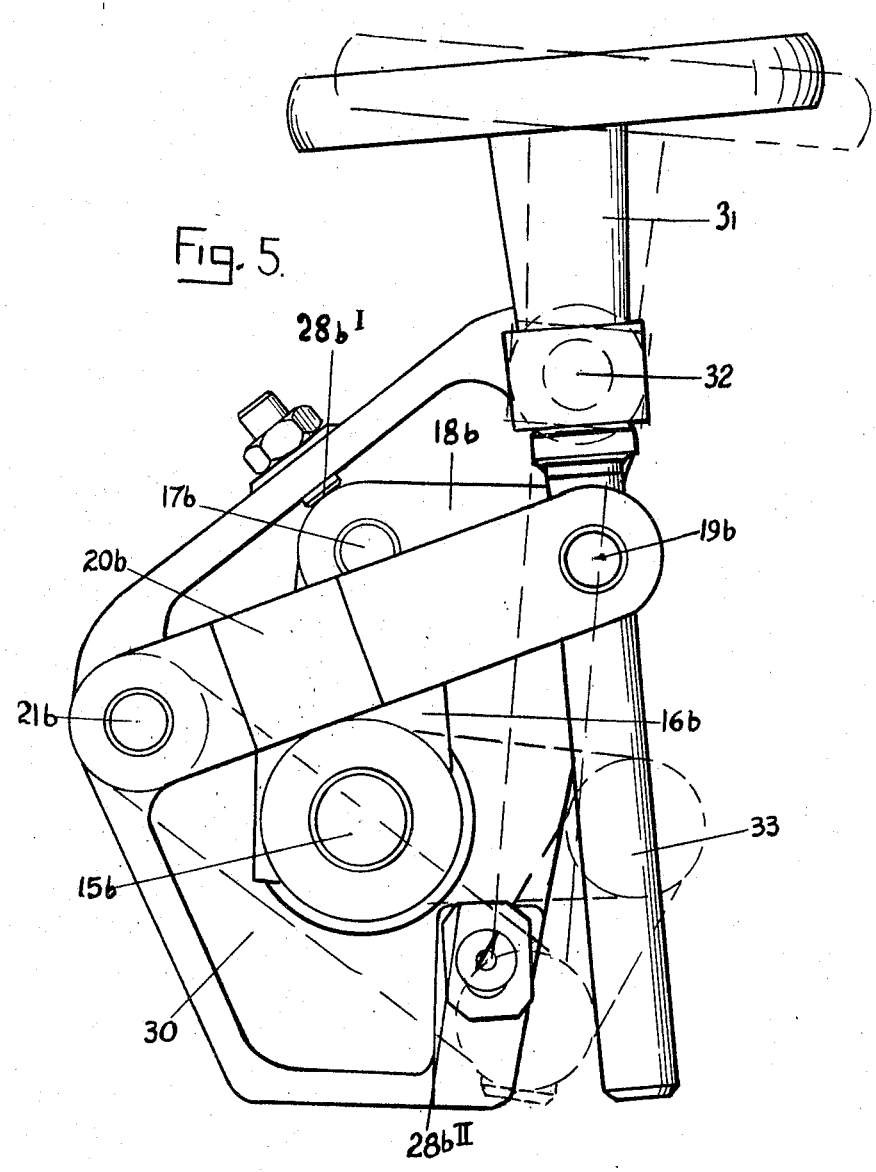

United States Patent Office 3,317,179
Patented May 2, 1967

3,317,179
VALVE OPERATING LINKAGES
Harold Victor Willis, Solihull, England, assignor to David F. Wiseman & Sons Limited, Birmingham, England, a British company
Filed July 31, 1964, Ser. No. 386,548
Claims priority, application Great Britain, Aug. 9, 1963, 31,447/63
6 Claims. (Cl. 251—58)

This invention relates to valve operating linkages for controlling rotatable valve members such as, for example, butterfly valve discs.

It is an object of the invention to provide a valve operating linkage which serves to provide an increasing torque to a rotatably valve member as the valve member is moved by the linkage towards a closed position. It is a further object of the invention to provide such a valve operating linkage which serves to rotate the valve member from its closed position at an increasing angular velocity with uniform movement of the operating force applied to the linkage.

The invention consists in a valve operating linkage for mounting on a valve body housing a rotatable valve member, characterised by a link adapted adjacent a first end for eccentric pivotal connection to the valve member externally of the housing, a radius limb pivoted adjacent a first end to the link adjacent a second end of the latter, said radius limb being adapted adjacent a second end of the latter for pivotal connection to the valve body and means for applying thrust adjacent the pivot connection between the link and the limb for rotating the valve member, the linkage being such that, when mounted, the limb and link approach alignment with one another as the valve is closed.

Typical examples of the practical realisation of the invention will now be described with reference to the accompanying drawings, in which:

FIGURES 1 and 2 are front elevations, and FIGURE 3 is a side elevation of a first example;

FIGURE 4 is a front elevation of a second example, and

FIGURE 5 is a front elevation of a third example.

Figure 1:
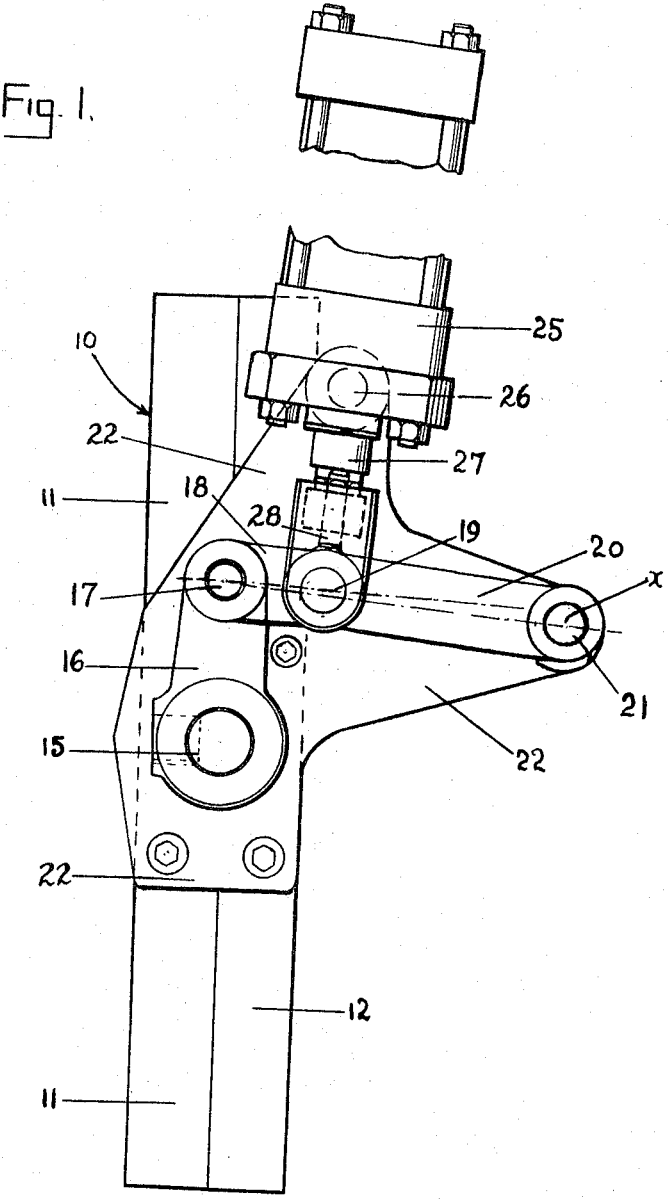

FIGURES 1-3 of the drawings show a valve body 10 split into two parts 11 and 12 and housing a butterfly disc 13 fast on a spindle 14 transverse of the passageway through the body 10. The spindle 14 has an end portion 15 projecting externally of the valve body 10 to facilitate rotation of the spindle 14 and disc 13 through approximately 90° between fully open and fully closed positions of the latter.

An arm 16 is fixed to and projects radially from the end portion 15, and is pivoted at 17 to a link 18 which in turn is pivoted at 19 to a radius limb 20. The opposite end of the limb 20 to pivot 19 has a pivotal connection through an adjustment pin 21 carried by a mounting member in the form of a plate 22 fixed on the valve body 10. The adjustment pin 21 comprises two cylindrical portions 23 and 24 with parallel eccentric axes X and Y, as best shown in FIGURE 3. The first portion 23 is rotatably mounted in the radius limb 20 to constitute the pivotal connection of the limb 20 to the plate 22, and the second portion 24 is mounted so as to be angularly adjustable upon the plate 22. Angular adjustment of the second portion 24 effectively turns the first portion 23 through an arc about the axis Y of the second portion 24 to alter the location of the pivot axis X.

A piston and cylinder assembly 25 is pivoted at 26 on the mounting plate 22, and acts through a piston rod 27 on to the pivotal connection at 19. The pivotal connection 19 co-operates with an adjustable stop 28 on the mounting plate 22.

FIGURE 1 shows the valve in the closed position, and it will be seen that the arm 16 is approximately perpendicular to the link 18, so that forces exerted along the link 18 gives the maximum torque to the spindle 14, and that the link 18 and radius limb 20 are approximately aligned to form a toggle linkage. In addition the piston rod 27 acts approximately perpendicularly to the members of the toggle linkage, i.e., the link 18 and the limb 20. Consequently, when the piston and cylinder assembly 25 is actuated to open the valve, i.e., to move the parts from the positions shown in FIGURE 1 to those in FIGURE 2, the effect of the toggle linkage, aided by the perpendicular dispositions of the arms 16 and the piston rod 27 in relation to the toggle linkage, is to provide a very high initial opening torque on the spindle 14. This very high torque serves to open or "crack" the butterfly disc 13. As the valve is further opened, the toggle effect rapidly diminishes as the link 18 and limb 20 move further out of alignment with one another, whereby the valve is opened at an increasing angular velocity with uniform movement of the piston rod 27 providing the operating force for the linkage. As the valve is closed the link 18 and the limb 20 approaches alignment with one another to apply an increasing torque to the spindle 14 to clamp the disc 13 shut.

By adjustment of the stop 28 the link 18 and limb 20 are arranged to pass through alignment with one another into an over-centre position before abutment with the stop 28, with the important advantage that fluid pressure can be released in the piston and cylinder assembly 26 without risk of inadvertent opening of the valve taking place.

The angular disposition of the spindle 14 and disc 13 when the link 18 and limb 20 are aligned is determined by the location of axis X. Thus adjustment of the location of axis X by the eccentric pin 21 serves to suit the settings of the linkage and disc 13 in the closed position of the latter.

FIGURE 4 shows a second example of the invention in which parts corresponding to the parts shown in FIGURES 1-3 have been given the same reference numerals with the suffix $a$. In this example the valve is shown in full in the closed position and in broken lines in the open position.

It will be appreciated from the drawing that the link 18$a$ and the radius limb 20$a$ are aligned with one another in the closed position of the valve in overlying relationship contrasting with the approximate alignment as rectilinear extensions of one another of the link 18 and the limb 20. However, a toggle action is still effective to "crack" and to clamp shut the valve. In this example there is no adjustment pin 21, the pivotal connection 21$a$ of the limb 20$a$ to the mounting plate 22$a$ being fixed, the limits of movement of the linkage are defined by fixed stops 28$a'$ and 28$a''$, and movement is effected manually through a handle 29.

FIGURE 5 shows a third example of the invention in which parts corresponding to those described with reference to FIGURES 1-3 are given the same reference numerals with the suffix $b$. It will be seen from the drawing that the linkage is secured on a plate 30 which is suitable for mounting on many types of valve bodies having a rotatable valve member, provided that the spindle carrying the valve element has an end oprtion 15$b$ which projects externally of the housing for fixing to the arm 16$b$. As the valve is closed in this example, that is as it approaches the position shown in full lines in FIGURE 5, the link 18$b$ and radius limb 20$b$ approach alignment overlying one another, but do not fully achieve such alignment. However, the toggle effect becomes operative as the valve approaches closure to provide high closing (and opening) torque.

In the last example a handwheel 31 pivoted at 32 and having a threaded stem 33 passing through the pivotal connection 19b is manually rotatable to reciprocate the connection 19b and operate the linkage. This operation takes place between adjustable stops 28b' and 28b".

I claim:

1. An operator for a valve assembly wherein a valve member is rotatably mounted within a valve body and has an operating spindle projecting from said body, a radially extending arm fixed on said spindle, a pair of mutually pivotally connected links forming a toggle linkage, with one link pivotally connected adjacent an end to said arm, and the other link pivotally connected adjacent an end on said body, an operator motor having a movable fluid pressure responsive element connected to apply thrust to said linkage adjacent the pivotal connection between the links for turning the valve member, said arm and toggle linkage being so constructed and arranged that when the operator is mounted in the valve assembly with said valve member in value closed position said arm is approximately perpendicular to said one link and the pivotal connection between said links lies in an over center position on one side of a line containing the pivot axes of said links on the arm and valve body respectively, said links during normal valve operation passing through alignment with each other as the valve member approaches said closed position, and an adjustable stop operative to determine the angular relationship between said links in the closed position of the valve member.

2. A valve operator according to claim 1 comprising means for adjusting one of the toggle linkage pivots relative to the other two pivots.

3. A valve operator according to claim 2 wherein said adjustable means comprises a pivot pin having two eccentric portions with parallel axes, one portion being rotatably adjustable relative to the valve body and the other portion providing the pivotal connection between the toggle linkage and the valve body.

4. A valve operator according to claim 1, wherein said motor comprises a housing pivoted to the valve body and has a reciprocable thrust rod extending from said fluid pressure responsive element into pivotal connection with said toggle linkage at the pivot between said links.

5. A valve operator as defined in claim 1, wherein said motor comprises a thrust element pivotally connected to the pivot connection between said links.

6. An operator for a valve assembly wherein a valve member is rotatably mounted within a valve body and has an operating spindle projecting from said body, a radially extending arm fixed on said spindle, a pair of mutually pivotally connected links forming a toggle linkage, with one link pivotally connected adjacent an end to said arm, and the other link pivotally connected adjacent an end on said body, an operator motor having a movable fluid pressure responsive element connected to apply thrust to said linkage adjacent the pivotal connection between the links for turning the valve member, said arm and toggle linkage being so constructed and arranged that when the operator is mounted in the valve assembly with said valve member in valve closed position said arm is approximately perpendicular to said one link and the pivotal connection between said links lies in an over center position on one side of a line containing the pivot axes of said links on the arm and valve body respectively, said links during normal valve operation passing through alignment with each other as the valve member approaches said closed position, and a mounting member fixed to said valve body and carrying said operator motor and the toggle linkage, said toggle linkage being pivotally connected adjacent said other link end to the mounting member.

References Cited by the Examiner

UNITED STATES PATENTS

| | | | |
|---|---|---|---|
| 1,161,374 | 11/1915 | Bjorklund | 251—234 X |
| 1,893,705 | 1/1933 | Jensen | 74—106 |
| 2,365,927 | 12/1944 | Allen | 251—234 X |
| 2,704,947 | 3/1955 | Hopkins | 251—234 X |
| 2,911,953 | 11/1959 | Killian | 251—58 X |
| 3,204,920 | 9/1965 | Generke | 251—58 |

FOREIGN PATENTS 1,111,732  11/1955  France.

M. CARY NELSON, *Primary Examiner.*

A. ROSENTHAL, *Assistant Examiner.*